(12) United States Patent
Bruker

(10) Patent No.: US 6,813,473 B1
(45) Date of Patent: Nov. 2, 2004

(54) REMOTE LABORATORY

(75) Inventor: Dov Bruker, Herzliya (IL)

(73) Assignee: Science-On-Line, Petach Tikva (IL)

( * ) Notice: Subject to any disclaimer, the term of this patent is extended or adjusted under 35 U.S.C. 154(b) by 163 days.

(21) Appl. No.: 10/048,699

(22) PCT Filed: Jul. 25, 2000

(86) PCT No.: PCT/IL00/00440
§ 371 (c)(1),
(2), (4) Date: May 2, 2002

(87) PCT Pub. No.: WO01/09862
PCT Pub. Date: Feb. 8, 2001

(30) Foreign Application Priority Data

Aug. 1, 1999 (IL) ................................. 131195

(51) Int. Cl.[7] .............................................. G09B 3/00
(52) U.S. Cl. .................... 434/350; 434/118; 434/276; 434/362; 434/365; 702/19
(58) Field of Search .......................... 434/118, 307 R, 434/308, 315, 316, 320, 322, 323, 342, 350, 362, 365, 432, 276; 463/22, 23, 48; 705/3, 40; 345/338, 339, 419, 421, 424, 473, 520, 521; 700/11, 17, 56, 83, 86; 702/22, 25, 27, 19; 707/102, 104.1; 706/11, 45, 47, 60, 927; 708/142, 250, 802; 709/321; 422/67, 68.1; 600/300; 73/32 R; 436/43, 48; 435/5; 356/73; 427/2.11

(56) References Cited

U.S. PATENT DOCUMENTS

| | | | | |
|---|---|---|---|---|
| 4,315,309 A | * | 2/1982 | Coli ............................... 705/3 |
| 5,025,391 A | * | 6/1991 | Filby et al. .................... 706/45 |
| 5,139,744 A | * | 8/1992 | Kowalski ....................... 422/67 |
| 5,161,222 A | * | 11/1992 | Montejo et al. ............. 709/321 |
| 5,366,896 A | * | 11/1994 | Margrey et al. ............... 436/48 |
| 5,484,293 A | * | 1/1996 | Ford et al. .................... 434/432 |
| 5,551,022 A | * | 8/1996 | Tariq et al. ............... 707/104.1 |
| 5,652,013 A | * | 7/1997 | Patch et al. ................ 427/2.11 |
| 5,925,514 A | * | 7/1999 | Layne et al. .................... 435/5 |
| 6,122,042 A | * | 9/2000 | Wunderman et al. .......... 356/73 |
| 6,261,103 B1 | * | 7/2001 | Stephens et al. ............. 434/276 |
| 6,287,254 B1 | * | 9/2001 | Dodds .......................... 600/300 |
| 6,321,589 B1 | * | 11/2001 | Regimand ................... 73/32 R |
| 6,376,251 B1 | * | 4/2002 | Braun et al. ................... 436/43 |
| 2002/0059030 A1 | * | 5/2002 | Otworth et al. ............... 702/19 |
| 2002/0081231 A1 | * | 6/2002 | Shapiro et al. ............. 422/68.1 |

* cited by examiner

Primary Examiner—Joe H. Cheng
(74) Attorney, Agent, or Firm—Olson & Hierl, Ltd.

(57) ABSTRACT

Teaching apparatus, which includes an experimental setup (50) at a laboratory site (32) and a teaching setup at a teaching facility (12) remote from the laboratory site. The laboratory site includes one or more experimental controls (38) for varying one or more parameters of an experiment performed by the experimental setup, one or more monitoring device (42, 44) which capture information relating to the experiment, and a first communications interface (34) which couples the experimental controls and monitoring devices to a network (28). The teaching setup includes a second communication interface (22) coupled to exchange data via the network with the first communication interface, a display (26) which receives and displays the information captured by the one or more monitoring device, and a physical representation (16) of at least a part of an experimental setup, including at least one of the experimental controls, so that an operator (14) at the teaching facility controls an aspect of an experiment at the laboratory site using the physical representation, and receives results of the experiment by means of the display.

41 Claims, 4 Drawing Sheets

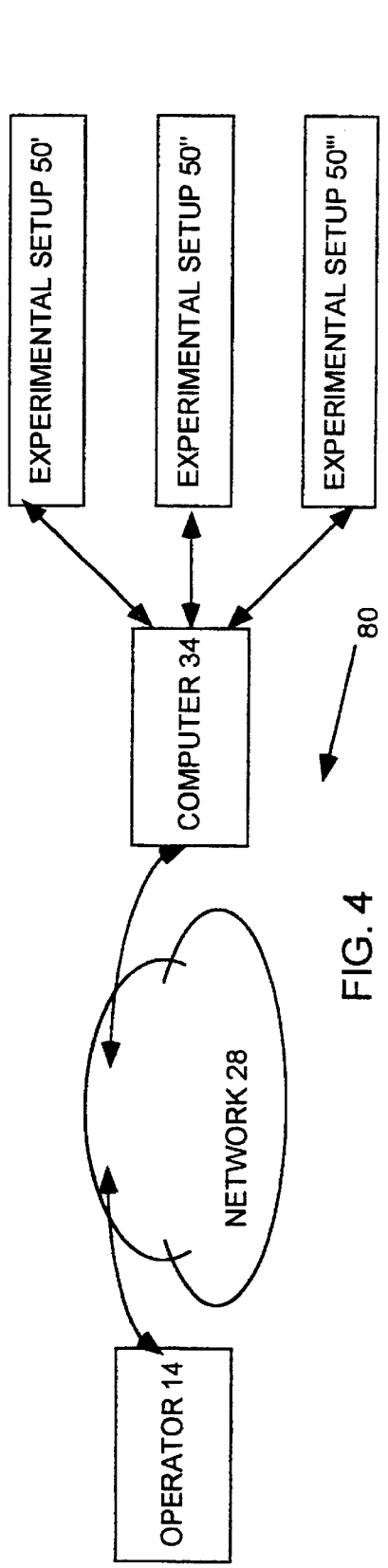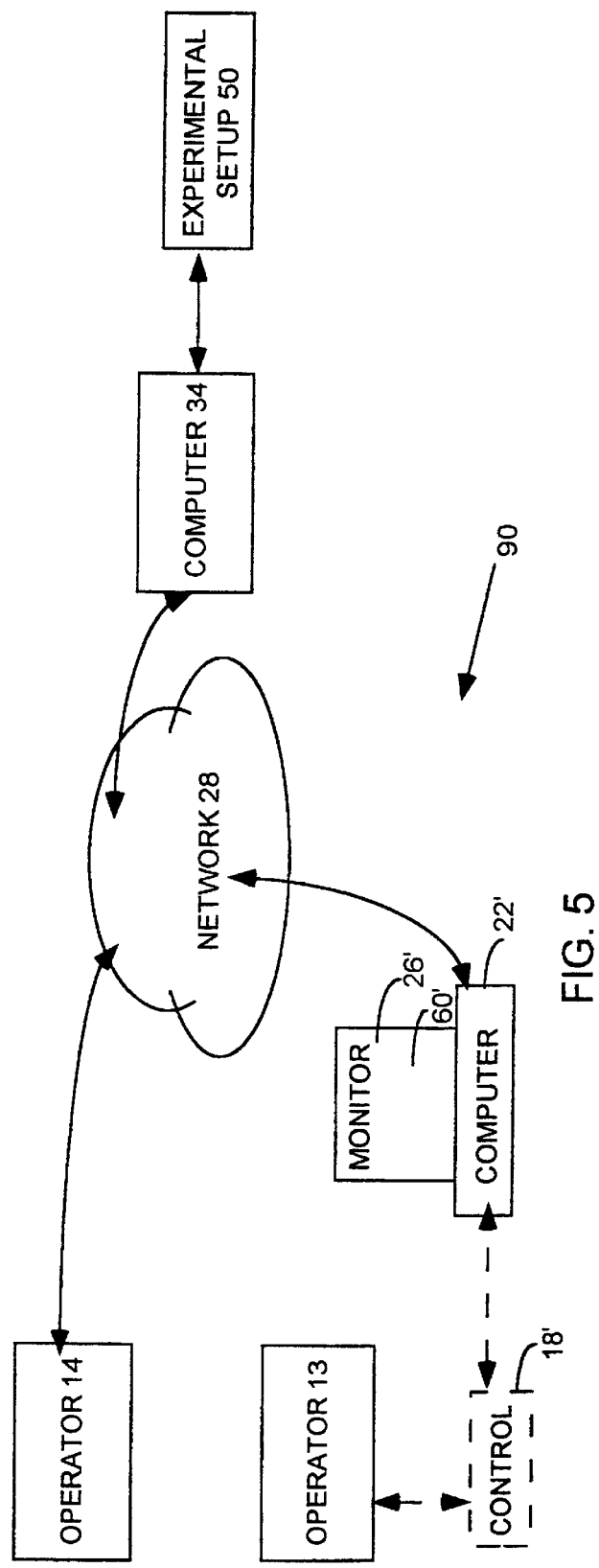

REMOTE LABORATORY

FIELD OF THE INVENTION

The present invention relates generally to science laboratories, and specifically to laboratories for the purposes of teaching a scientific topic.

BACKGROUND OF THE INVENTION

Laboratories for teaching science topics to students at school and college have been an integral part of teaching pedagogy for at least a century. Amongst other aims, teaching laboratories have served the purpose of giving physical reality to theoretical concepts, and have enabled students to become proficient practically as well as theoretically.

In a teaching environment, laboratories demand a relatively large portion of the education budget, from a number of points of view. At the design and construction phases a laboratory has to be purpose-built, with specific facilities, compared to a general purpose class room or lecture hall. Once up and running, the laboratory has to be maintained, for example, equipment has to be bought and/or renewed. In many school situations laboratories are a bottleneck in preparing a timetable, since one laboratory may have to serve many classes and a number of grades.

With the advent of distance learning, problems caused by lack of laboratory facilities have been exacerbated. The problems have been somewhat alleviated by home experiments, often performed with specialized kits, or by students spending a portion of their course time at a laboratory away from their home. However, distance learning, and the growth of networks such as the Internet, have also generated the idea of a remote laboratory, i.e., one which is accessible from a home or a location remote from the laboratory.

Carnegie Mellon University operates a remote laboratory which allows students within the university framework to access remote electrical engineering experiments. The experiments comprise a circuit measurement procedure and a motor control experiment, both of which are interactively performed by students with a computer over a local network.

Oxford University, England, has a Chemistry Information Technology Center which allows students to carry out interactive simulation experiments over the Internet. These experiments are performed by students with a computer interacting via the Internet with the experiment.

The Yorkshire and Humberside Universities Association, England, has proposed developing a shared virtual learning environment comprising one or more remote laboratories. In their proposal, which can be found at http://www2.dcs.hull.ac.uk/SVLE/svlerept.html and which is incorporated herein by reference, they point out some of the problems involved with virtual or remote laboratories. Problems foreseen include the risk that students will be only "virtually educated," and that "a keyboard and mouse cannot offer the same 'feel' as real equipment."

SUMMARY OF THE INVENTION

It is an object of some aspects of the present invention to provide methods and apparatus for an improved remote laboratory.

It is a further object of some aspects of the present invention to provide methods and apparatus for improvement of the verisimilitude of a remote laboratory.

It is a yet further object of some aspects of the present invention to provide methods and apparatus for an operator to be able to operate an experimental setup which is hazardous or inaccessible to the operator.

In some preferred embodiments of the present invention, an experiment is set up in a remote laboratory at a location physically distant from a local facility wherein an experiment operator performs the experiment. The operator is able to perform the experiment by communicating with the remote laboratory, preferably by communicating via an industry-standard computer in the operator's location, over a distributed network such as the Internet. Most preferably, communication from the operator comprises commands which alter parameters of the experiment. Additionally or alternately, communication from the operator comprises commands which enable the operator to remotely control experiment-monitoring instrumentation, such as one or more video cameras, which transmit information concerning an overall state of the experiment.

Communication from the operator comprises the operator using one or more local physical controls which simulate and act as controllers for respective remote physical controls within the remote laboratory. The one or more local physical controls comprise a physical representation of at least a part of an experimental setup at the remote laboratory, which representation is most preferably substantially identical in appearance and operation to the actual setup. The controls are used to adjust respective parameters of the remote experiment and/or the experiment-monitoring instrumentation, by correspondingly adjusting their respective remote controls. By using local physical controls, as compared to local simulated controls, the realism of the experiment performed at the local facility is significantly enhanced, so that the operator using the local physical controls is better able to understand and operate the experimental setup. Furthermore, the operator is able to perform experiments using equipment that may be hazardous or inaccessible in a local facility.

In some preferred embodiments of the present invention, data from the experiment is presented to the operator via a graphic user interface. Preferably, the interface comprises a real-time video image of the experimental setup at the remote facility, as well as controls which enable the operator to alter settings of the controls using a computer pointing device such as a mouse. In some preferred embodiments of the present invention, the operator in the local facility is able to access separately a plurality of remote experimental setups, preferably by using a menu included in the graphic interface. Most preferably, the plurality of remote experimental setups are located at a single remote facility. Alternatively, the plurality of experimental setups are located at two or more remote facilities.

In some preferred embodiments of the present invention, a second operator is able to access the remote facility and observe the experiment performed by the first operator. Optionally, the second operator is able to control at least some of the instrumentation at the remote facility, for example to adjust some of the experiment-monitoring instrumentation. Alternatively, the second operator has physical controls local to the second operator, which controls adjust different experimental parameters at the remote facility from those adjusted by the first operator, and the two operators cooperate in performing the experiment at the remote facility.

There is therefore provided, in accordance with a preferred embodiment of the present invention, teaching apparatus, including:

an experimental setup at a laboratory site including:

one or more experimental controls for varying one or more parameters of an experiment performed by the experimental setup;

one or more monitoring devices, which capture information relating to the experiment; and a first communications interface, which couples the experimental controls and monitoring devices to a network; and a teaching setup at a teaching facility remote from the laboratory site, including:

a second communications interface coupled to exchange data via the network with the first communications interface;

a display, which receives and displays the information captured by the one or more monitoring devices; and a physical representation of at least a part of an experimental setup, including at least one of the experimental controls, so that an operator at the teaching facility controls an aspect of the experiment at the laboratory site using the physical representation, and receives results of the experiment by means of the display.

Preferably, the apparatus includes a computer at the laboratory site, which operates the one or more experimental controls.

Preferably, the one or more experimental controls are operated by a second operator, other than the operator at the teaching facility.

Preferably, the one or more experimental controls include one of a group of controls consisting of a rotatable knob, a slideable control, and a switch.

Alternatively, the one or more monitoring devices include one or more video cameras which generate one or more images of the experimental setup.

Preferably, the one or more video cameras are operated by the one or more experimental controls.

Preferably, the one or more experimental controls include one or more robot positioning devices which adjust the one or more parameters of the experiment.

Preferably, the display includes a graphic user interface including controls enabling the operator to control the experimental setup.

Alternatively, the graphic user interface includes a graphical presentation of the results.

Alternatively, the computer stores the results of the experiment.

Preferably, the apparatus includes a computer at the teaching facility which stores the results of the experiment.

Preferably, the experimental setup includes a plurality of substantially independent experiments.

Alternatively, a second operator, other than the operator at the teaching facility, controls the aspect of the experimental setup.

Preferably, the apparatus includes apparatus at the teaching facility which is used in conjunction with the experimental setup to make experimental measurements.

Alternatively, the laboratory site is remote from the Earth's surface.

There is further provided, in accordance with a preferred embodiment of the present invention, apparatus for performing an experiment at a teaching facility using an experimental setup at a laboratory site remote from the facility, the experimental setup including one or more experimental controls for varying one or more parameters of the experiment, one or more monitoring devices which capture information relating to the experiment, and a first communications interface which couples the experimental controls and monitoring devices to a network, the apparatus including:

a second communications interface, coupled to exchange data via the network with the first communications interface, a display, which receives and displays the information captured by the one or more monitoring devices in order to enable a numerical measurement to be made, and a physical representation of at least a part of the experimental setup, including at least one of the experimental controls, so that an operator at the teaching facility controls an aspect of the experiment at the laboratory site using the physical representation, and receives results of the experiment by means of the display.

Preferably, the apparatus includes a computer at the laboratory site, which operates the one or more experimental controls.

Preferably, the one or more experimental controls are operated by a second operator, other than the operator at the teaching facility.

Alternatively, the one or more experimental controls include one of a group of controls consisting of a rotatable knob, a slideable control, and a switch.

Alternatively, the one or more monitoring devices include one or more video cameras which generate one or more images of the experimental setup.

Preferably, the one or more video cameras are operated by the one or more experimental controls.

Preferably, the one or more experimental controls include one or more robot positioning devices which adjust the one or more parameters of the experiment.

Preferably, the display includes a graphic user interface including controls enabling the operator to control the experimental setup.

Alternatively, the graphic user interface includes a graphical presentation of the results.

Preferably, the computer stores the results of the experiment.

Preferably, the apparatus includes a computer at the teaching facility which stores the results of the experiment.

Preferably, the experimental setup includes a plurality of substantially independent experiments.

Alternatively, a second operator, other than the operator at the teaching facility, controls the aspect of the experimental setup.

Alternatively, the apparatus includes apparatus at the teaching facility which is used in conjunction with the experimental setup to make experimental measurements.

Alternatively, the laboratory site is remote from the Earth's surface.

There is further provided, in accordance with a preferred embodiment of the present invention, a method for performing an experiment using an experimental setup at a laboratory site having one or more experimental controls for varying one or more parameters of the experiment, while controlling and monitoring the experiment at a teaching facility remote from the laboratory site, including:

providing one or more experimental controls and one or more monitoring devices at the laboratory site;

providing a physical representation of at least a part of the experimental setup, including at least one of the experimental controls, at the teaching facility;

responsive to operation of the physical representation of the experimental controls at the teaching facility, exchanging data between the laboratory site and the teaching facility via a network so as to vary one or more parameters of the experiment;

capturing information relating to the experiment using one or more monitoring devices at the laboratory site; and transferring the captured information over the network for display at the teaching facility.

Preferably, exchanging data between the laboratory site and the teaching site includes allocating a level of access for the operation of the physical representation.

Preferably, providing the one or more experimental controls includes operating the one or more experimental controls by a computer at the laboratory site.

Preferably, the operation of the physical representation is performed by at least one operator.

Alternatively, capturing information includes generating one or more images of the experimental setup.

Preferably, providing the one or more monitoring devices includes providing one or more video cameras which are operated by the one or more experimental controls.

Alternatively, providing the one or more experimental controls includes providing one or more robot positioning devices which adjust the one or more experimental controls.

Preferably, transferring the captured information includes displaying a graphic user interface including controls enabling the operator to control the experimental setup.

Preferably, transferring the captured information includes storing the results of the experiment in the computer.

Alternatively, transferring the captured information includes storing the results of the experiment in a computer at the teaching facility.

Alternatively, the method includes providing apparatus at the teaching facility which is used in conjunction with the experimental setup to make experimental measurements.

The present invention will be more fully understood from the following detailed description of the preferred embodiments thereof, taken together with the drawings, in which:

BRIEF DESCRIPTION OF THE DRAWINGS

FIG. 4 is a schematic block diagram of a remote laboratory system, according to an alternative embodiment of the present invention;

FIG. 5 is a schematic block diagram of a remote laboratory system, according to another alternative embodiment of the present invention.

DETAILED DESCRIPTION OF PREFERRED EMBODIMENTS

Figure 1:
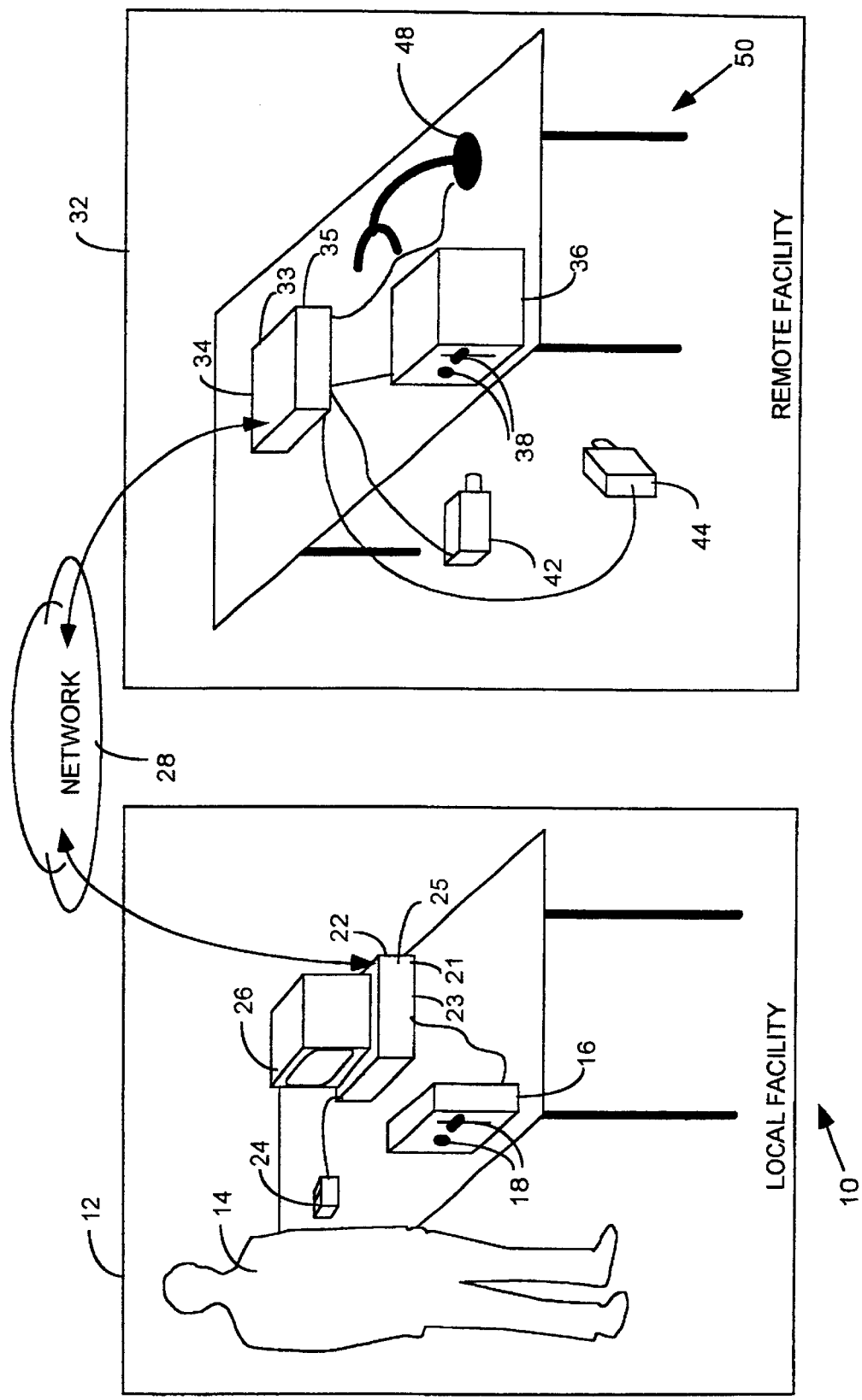
FIG. 1 is a schematic illustration of a remote laboratory system, according to a preferred embodiment of the present invention.

FIG. 1 is a schematic illustration of a remote laboratory system 10, according to a preferred embodiment of the present invention. A local facility 12, most preferably a teaching facility, is utilized by an experiment operator 14 present in the facility in order to operate system 10. Also present in facility 12 is an industry-standard computer 22, comprising a central processing unit 21 and a memory 23, which operates an audio-visual display 26. Preferably, operator 14 uses a pointing device 24 to interact with computer 22 and display 26 in order to operate the computer. Most preferably, computer 22 communicates with a distributed network 28 such as the Internet, so acting as a communications interface with the network. A simulator device 16, which is a physical representation of at least a part of an experimental setup 50 described in detail hereinbelow, is present in local facility 12, and is connected to computer 22. Simulator 16 comprises one or more local controls 18 that are physically manipulable by operator 14, which manipulation generates a respective value of a signal corresponding to a position of the respective control, so that the operator is able to manipulate controls 18 and thereby operate setup 50.

An experimental setup 50 is installed and operates in a remote facility 32, which facility is physically separate from local facility 12. Setup 50 comprises an industry-standard controlling computer 34 which operates experimental equipment 36 on an automatic or semi-automatic basis, and which receives information generated by the equipment. Computer 34 most preferably comprises a central processing unit 33 and a memory 35. Equipment 36, described and exemplified in more detail hereinbelow, comprises one or more controls 38, which correspond to respective controls 18 of simulator 16. Preferably, the one or more controls 18 are physically similar to their respective controls 38. For example, if controls 38 comprise a rotatable knob, a slideable control, and a switch, which might be used to adjust a potentiometer, a rheostat and a circuit breaker, controls 18 respectively comprise a rotatable knob, a slideable control, and a switch. It will be appreciated that since controls 18 simulate respective controls 38, the one or more controls 18 may be physically different from their respective controls 38.

Preferably, setup 50 further comprises one or more equipment-observing video cameras 42, which are used to generate video images of details of equipment 36, and one or more setup-observing cameras 44 which are used to generate video images of the overall arrangement of setup 50. Preferably, cameras 42 and 44 are mounted on positioning devices which may be remotely controlled by commands issued by computer 34, by methods known in the art. Thus computer 34 and cameras 42 and 44 act as monitoring devices for setup 50. Optionally, setup 50 comprises one or more robot positioning devices 48 that are used in addition to controls 38 in order to operate equipment 36. Alternatively, at least some of controls 38 or devices 48 may be operated by a human controller at remote facility 32. Cameras 42 and 44, and devices 48 are controlled by computer 34, which communicates with network 28, acting as a communications interface with the network, and which also, most preferably, operates as an overall controller for system 10.

Equipment 36 preferably comprises industry-standard apparatus which is used to make measurements and output values of physical phenomena, which apparatus is typically used in a teaching laboratory environment. Most preferably, equipment 36 comprises a data logger coupled to one or more appropriate measuring probes, such as the Multilog system and associated probes produced by Fourier Systems of Petah Tiqva, Israel. Alternatively or additionally, equipment 36 comprises apparatus that can be provided by a recognized supplier of laboratory apparatus for teaching facilities, such as apparatus listed in the "Fisher Science Education 98/99" catalog published by Fisher Science Education of Burr Ridge, Ill., which is incorporated herein by reference. If necessary, equipment 36 is adapted by methods known to those skilled in the art so as to be operable by computer 34. Alternatively or additionally, equipment 36 comprises apparatus which is partially or totally constructed from purpose-built and/or industry-standard components, for the purpose of making scientific measurements. Most preferably, equipment 36 is operable by computer 36 without the intervention of a human controller at facility 32. Optionally, at least some of the operations needed for operation of equipment 36, such as powering the equipment on or resetting the equipment, may be performed by the controller of facility 32. Most preferably, during operation of facility 32, if operator 14 encounters difficulties or has questions, operator 14 is able to contact the controller of facility 32 in order to resolve the difficulties or receive help.

Some examples of equipment 36 are described hereinbelow:

Example 1: Equipment 36 comprises a spectrophotometer which measures a visible spectral absorption of a material placed by robot positioning device 48 in the spectrophotometer.

Example 2: Equipment 36 comprises a fixed resistor wherein values of current may be determined responsive to known electric potentials placed across the resistor, so that Ohm's law may be verified.

Example 3: Equipment 36 comprises a cart which is able to roll down an inclined plane, wherein motion of the cart may be analyzed. Most preferably an angle of the plane is adjustable by a first robot device 48, and the cart is positioned at the top of the plane by a second robot device 48.

Example 4: Equipment 36 comprises standard equipment for finding a measure of G, the universal gravitational constant. The equipment comprises a first pair of masses connected by a rod, wherein the rod is suspended from its center by a quartz fiber acting, as torsion balance. A deflection of the rod is produced by robot device 48 bringing a second pair of masses into proximity with the first pair of masses.

Example 5: Equipment 36 comprises a simple pendulum for finding an acceleration of gravity at facility 32. The bob of the pendulum is deflected by robot device 48, and the experiment is started by device 48 releasing the bob.

Other examples of equipment 36 will be apparent to those skilled in the art.

Figure 2:
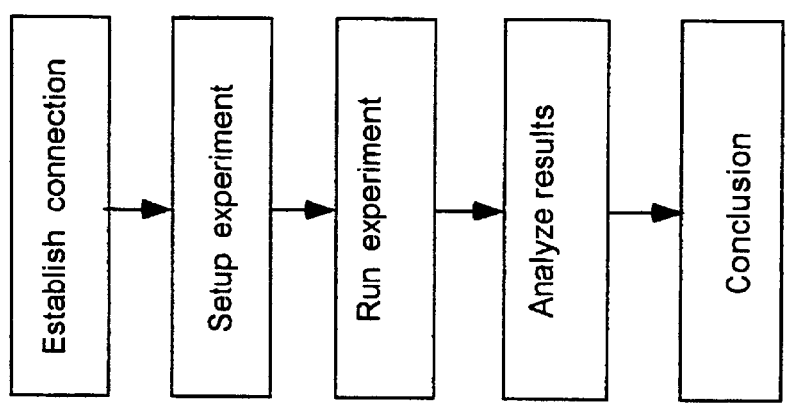
FIG. 2 is a flowchart describing a method of operation of the remote laboratory system of FIG. 1, according to a preferred embodiment of the present invention.

FIG. 2 is a flowchart describing a method of operation of remote laboratory system 10, according to a preferred embodiment of the present invention. In an initial step, operator 14 establishes a connection between local facility 12 and remote facility 32. Most preferably, the connection is established by operator 14 using an industry-standard webbrowser and entering a site address for facility 32. Optionally, operator 14 also transmits details such as a password or a user name to computer 34, wherein a decision is made of a level of access to setup 50 that is to be granted to operator 14. Most preferably, operator 14 is granted "full access," wherein the operator is able to adjust substantially all controls of facility 32 operated by computer 34 via commands transmitted from the operator to computer 34. Other levels of access, described in more detail hereinbelow with reference to FIG. 5, are "partial access" wherein a person accessing remote facility 32 is given access to at least some of the controls of facility 32 operated by computer 34 connection to the operation of remote facility 32, and "observer access" wherein a person accessing remote facility 32 is given no access to the controls, but can observe equipment 36 in operation.

Figure 3:
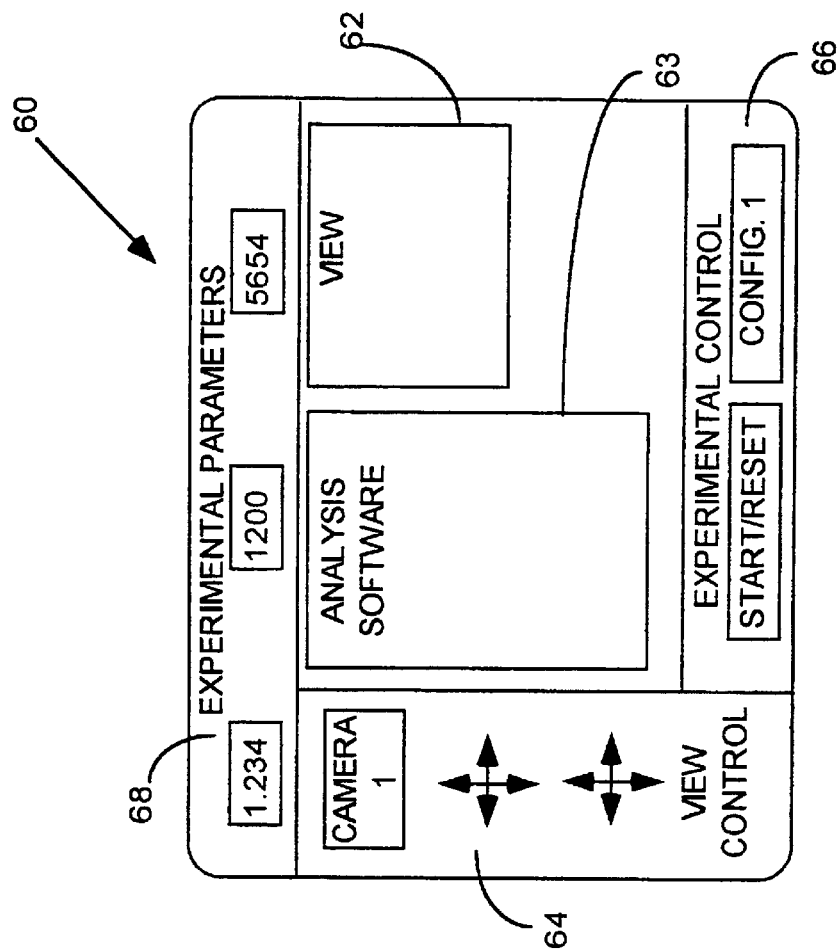
FIG. 3 is a schematic diagram showing a graphic user interface used in the system of FIG. 1, according to a preferred embodiment of the present invention.

FIG. 3 is a schematic diagram showing a graphic user interface (GUI) 60, according to a preferred embodiment of the present invention. GUI 60 is most preferably generated by computer 34 in one of the standard browser formats such as HTML, and after operator 14 has accessed facility 32, the user interface is transmitted to facility 12 via network 28 and is presented on display 26. GUI 60 comprises a view region 62 which most preferably shows a real-time image generated by one of cameras 42 or 44. A view-control region 64 comprises controls which enable operator 14 to choose a specific camera from cameras 42 or cameras 44 to control, and to adjust the viewing direction and/or other camera parameters such as magnification of the specific camera. The controls operate by transmitting signals from computer 22 via network 28 to computer 34. The controls in region 64 are preferably enabled and activated using pointing device 24, although any other method known in the art may also be used.

GUI 60 also comprises an experimental control region 66, which preferably includes setup controls that enable operator 14 to maintain an overall control of equipment 36. Preferably, region 66 comprises one or more controls enabling operator 14 to select an initial configuration of equipment 36, for example, a value of a resistor if the experiment is a verification of Ohm's law as described in example 2 above, or a slope at which an inclined plane is set if the experiment is to measure an object rolling down the plane as described in example 3 above. Preferably, the controls in region 66 comprise a start/reset control which operator 14 can use to initialize equipment 36 and then begin an experiment. Optionally, region 66 comprises controls which duplicate local controls 18. A parameter region 68 comprises experimental parameters which indicate a state of equipment 36, which parameters are transmitted from computer 34. For example, experimental parameters which may be included in region 68 are a local time at facility 32, data received by computer 34 relating to the experiment, and data describing a configuration of equipment 36, which configuration is preferably set using controls in region 66 and local controls 18.

GUI 60 further comprises an analysis region 63, wherein operator 14 is able to generate analyses of the experiment being performed. Preferably, region 63 comprises graphical and/or numerical analysis of the experimental results, which analysis is most preferably provided by a standard software analysis product such as DB-Lab, produced by Fourier Systems of Petah Tiqva, Israel.

Returning to FIG. 2, once operator 14 has obtained access to facility 32, the operator sets up equipment 36 using GUI 60, and/or local controls 18. In a run step operator 14 runs the experiment by using controls 18 and/or setup controls comprised in region 66. For example, in a verification of Ohm's law, as described in example 2 above, one of controls 18 is set by system 10 to control an electric potential across the resistor. Preferably, the value of the resistor is chosen by controls within region 66. As control 18 is manipulated by operator 14, the potential across the resistor is altered by computer 34 responsive to the manipulation, and values of potential and current through the resistor are transmitted to computer 22 which presents the values as data in region 68. Most preferably, manipulation of a specific control 18 by operator 14 causes computer 34 to generate a corresponding manipulation of the corresponding control 38 of equipment 36, which manipulation is preferably visible in an image generated by at least one of cameras 42 and/or cameras 44. Optionally, data generated during the experiment by manipulation of control 18 is stored in an industry-standard data base in memory 23 of computer 22, and/or in memory 35 of computer 34, which stored data may be utilized by operator 14 at some later time.

In an analysis step operator 14 utilizes the experimental data to perform an analysis of the experiment, and to draw one or more experimental conclusions. The data used may be data stored in memory 23 or memory 35, or alternatively, the analysis is performed with data transmitted to computer 22 at the time the experiment is performed. The data may be analyzed or presented in a form different from that output in interface 60, using methods known in the art. For example, the data may be used to generate one or more graphs, and the graphs may be analyzed to calculate parameters such as slope, regression coefficients, or intercepts of the graph. Most preferably, the data is displayed on-line in region 63 using a data analysis software package such as DB-Lab. In a conclusion step one or more conclusions regarding the experiment are drawn from the data and the analysis of the data.

FIG. 4 is a schematic block diagram of an arrangement 80 for setting up an experiment, according to an alternative preferred embodiment of the present invention. Computer 34 is connected to and is able to control a plurality of experimental setups 50', 50", 50"', ..., wherein each setup 50', 50", 50"', ..., is constructed and operates substantially as described above for experimental setup 50. Preferably, at least some of experimental setups 50', 50", 50"' comprise substantially identical experimental etups. For example, setup 50' and setup 50" both comprise equipment to verify Ohm's law. Alternatively or additionally, at least some of experiments 50', 50", 50"' comprise different experimental setups. For example, setup 50"' comprises equipment to measure the gravitational constant G. Optionally, at least some of experiments 50', 50", 50"' not within facility 32, and are physically remote from facility 32 and facility 12, while still being under overall control of computer 34. Most preferably, operator 14 in facility 12 is able to choose which setup to access, and hence which experiment to perform, from a menu presented in user interface 60.

FIG. 5 is a schematic block diagram of an arrangement 90 for performing an experiment, according to an alternative preferred embodiment of the present invention. Operator 14 accesses and operates experimental setup 50 as described above with reference to FIGS. 1, 2, and 3. In addition a second operator 13 establishes a connection with computer 34 and with experimental setup 50 via network 28. Preferably, operator 13 uses a computer 22' and a display 26', which are respectively substantially similar in operation to computer 22 and display 26, so that operator 13 receives a GUI 60' which is substantially similar in operation to GUI 60 received by operator 14. Operator 13 may operate independently of operator 14, or the two operators may operate cooperatively, preferably by communicating via network 28.

Most preferably, operator 13 is able to activate and adjust at least some of controls 64 and/or controls 66 (FIG. 3). For example, if operator 13 has been granted partial access to facility 32 and is operating independently of operator 14, operator 13 may select and then adjust a specific camera 44 in order to observe an aspect of experiment 36 as desired by operator 13. Thus operator 13 may observe setup 50 while the experiment is being run by operator 14. Alternatively, if operator 13 and operator 14 are operating on a cooperative basis, equipment 36 may be operated by operator 13 controlling some of the parameters of the equipment via GUI 60', while operator 14 controls some of the other experiment parameters via GUI 60.

Alternatively, operator 13 has a control 18', connected to computer 22' substantially as described above for control 18 and computer 22, and operator 13 is granted full access to facility 32. Most preferably experimental setup 50 is operated by operator 14 using one or more specific controls 18 to control some of controls 38, and operator 13 using one or more specific controls 18' to control other controls 38, so that the experiment is performed on a cooperative basis. Further alternatively, operator 13 is granted observer access to facility 32, in which case operator 13 is able to receive experimental data as operator 14 operates the experiment, but operator 13 is not able to adjust controls of the experiment. It will be appreciated that in arrangement 90 operator 13 and operator 14 may be in the same facility 12, or may be in different facilities.

Figure 6:
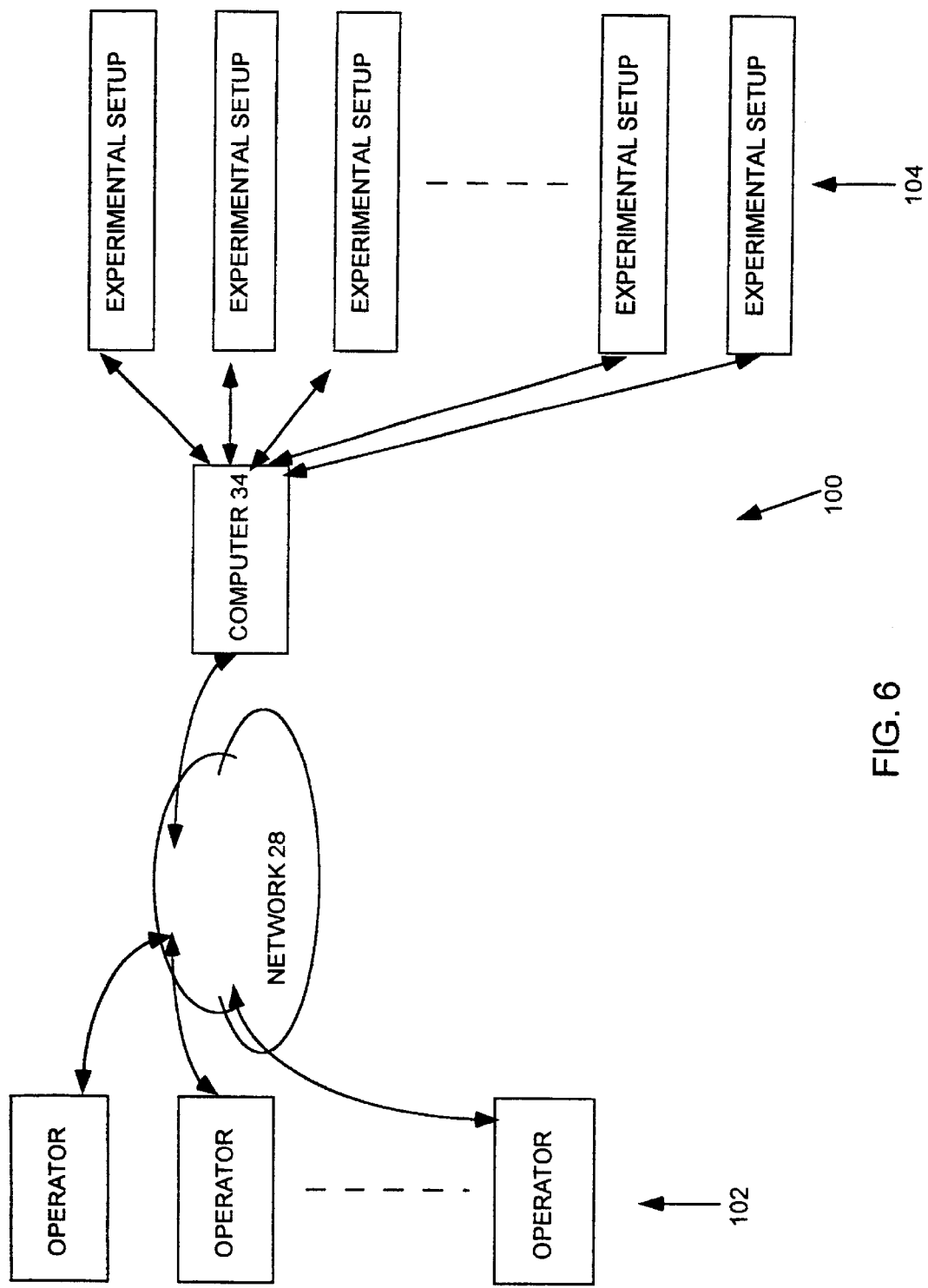
FIG. 6 is a schematic block diagram of a remote laboratory system, according to a further alternative embodiment of the present invention.

FIG. 6 is a schematic block diagram of an arrangement 100 for performing an experiment, according to an alternative preferred embodiment of the present invention. In arrangement 100 a plurality of operators 102 communicate via network 28 with computer 34, substantially as described above for operators 13 and 14 in arrangement 90. Computer 34 acts as an overall controller for a plurality of experimental setups 104, substantially as described above for experimental setups 50', 50", and 50"' in arrangement 80. Preferably, the plurality of operators is significantly larger than the plurality of experimental setups, in which case each experiment is controlled by a different operator, and operators who are not controlling an experiment are able to view the experimental setups as described above. Alternatively, operators who are not controlling an experimental setup are able to reserve a time when the experiment will be made available for their use. For example, computer 34 can maintain a database whereby operators are able to see which operators are operating a specific experiment, and wherein operators are able to enter their names in order to perform the experiment at some future time.

Referring back to FIG. 1, in some preferred embodiments of the present invention, local facility 12 comprises apparatus which is used in conjunction with equipment 36 at facility 32 in order to make experimental measurements. For example, if equipment 36 comprises the simple pendulum experiment as described above with reference to example 5, the period of the pendulum may be found from timing measurements performed at local facility 12. Such timing measurements may be generated using a clock 25 comprised in computer 22, or by any other timing apparatus known in the art.

While the preferred embodiments described above have utilized specific remote experiments and situations, it will be appreciated that the principles of remote laboratories described hereinabove may be applied to other experimental setups. For example, experiments which involve danger to the experiment operator, such as operating with high voltage electricity or radioactive material, may be safely performed as a remote laboratory according to the principles described above. Experiments which are performed in difficult or hazardous environments, such as experiments which need to be performed in a high vacuum, and/or under temperatures which are very high and/or very low, may also be incorporated into the experimental setup. Experiments which involve the use of rare and/or expensive materials, such as an experiment to non-destructively analyze the composition of a moon rock, can be setup as the remote experiment. It will also be appreciated that the remote experiment does not need to be terrestrially based, so that the remote facility may be sited in an Earth-orbiting satellite or any site remote from the Earth's surface.

It will be further appreciated that the preferred embodiments described above are cited by way of example. The full scope of the invention is limited only by the claims.

What is claimed is:

1. Teaching apparatus, comprising:
an experimental setup at a laboratory site comprising:
one or more experimental controls for varying one or more parameters of an experiment performed by the experimental setup;
one or more monitoring devices, which capture information relating to the experiment; and
a first communications interface, which couples the experimental controls and monitoring devices to a network; and
a teaching setup at a teaching facility remote from the laboratory site, comprising:
a second communications interface, coupled to exchange data via the network with the first communications interface;
a display, which receives and displays the information captured by the one or more monitoring devices; and
a physical representation of at least a part of an experimental setup, including at least one of the experimental controls, so that an operator at the teaching facility controls an aspect of the experiment at the laboratory site using the physical representation, and receives results of the experiment by means of the display.

2. Apparatus according to claim 1, and comprising a computer at the laboratory site, which operates the one or more experimental controls.

3. Apparatus according to claim 2, wherein the computer stores the results of the experiment.

4. Apparatus according to claim 1, wherein the one or more experimental controls are operated by a second operator, other than the operator at the teaching facility.

5. Apparatus according to claim 1, wherein the one or more experimental controls comprise one of a group of controls consisting of a rotatable knob, a slideable control, and a switch.

6. Apparatus according to claim 1, wherein the one or more monitoring devices comprise one or more video cameras which generate one or more images of the experimental setup.

7. Apparatus according to claim 5, wherein the one or more video cameras are operated by the one or more experimental controls.

8. Apparatus according to claim 1, wherein the one or more experimental controls comprise one or more robot positioning devices which adjust the one or more parameters of the experiment.

9. Apparatus according to claim 1, wherein the display comprises a graphic user interface comprising controls enabling the operator to control the experimental setup.

10. Apparatus according to claim 8, wherein the graphic user interface comprises a graphical presentation of the results.

11. Apparatus according to claim 1, and comprising a computer at the teaching facility which stores the results of the experiment.

12. Apparatus according to claim 1, wherein the experimental setup comprises a plurality of substantially independent experiments.

13. Apparatus according to claim 1, wherein a second operator, other than the operator at the teaching facility, controls the aspect of the experimental setup.

14. Apparatus according to claim 1, and comprising apparatus at the teaching facility which is used in conjunction with the experimental setup to make experimental measurements.

15. Apparatus according to claim 1, wherein the laboratory site is remote from the Earth's surface.

16. Apparatus for performing an experiment at a teaching facility using an experimental setup at a laboratory site remote from the facility, the experimental setup including one or more experimental controls for varying one or more parameters of the experiment, one or more monitoring devices which capture information relating to the experiment, and a first communications interface which couples the experimental controls and monitoring devices to a network, the apparatus comprising:
a second communications interface, coupled to exchange data via the network with the first communications interface;
a display, which receives and displays the information captured by the one or more monitoring devices in order to enable a numerical measurement to be made; and
a physical representation of at least a part of the experimental setup, including at least one of the experimental controls, so that an operator at the teaching facility controls an aspect of the experiment at the laboratory site using the physical representation, and receives results of the experiment by means of the display.

17. Apparatus according to claim 16, and comprising a computer at the laboratory site, which operates the one or more experimental controls.

18. Apparatus according to claim 17, wherein the computer stores the results of the experiment.

19. Apparatus according to claim 16, wherein the one or more experimental controls are operated by a second operator, other than the operator at the teaching facility.

20. Apparatus according to claim 16, wherein the one or more experimental controls comprise one of a group of controls consisting of a rotatable knob, a slideable control, and a switch.

21. Apparatus according to claim 16, wherein the one or more monitoring devices comprise one or more video cameras which generate one or more images of the experimental setup.

22. Apparatus according to claim 20, wherein the one or more video cameras are operated by the one or more experimental controls.

23. Apparatus according to claim 16, wherein the one or more experimental controls comprise one or more robot positioning devices which adjust the one or more parameters of the experiment.

24. Apparatus according to claim 16, wherein the display comprises a graphic user interface comprising controls enabling the operator to control the experimental setup.

25. Apparatus according to claim 16, wherein the graphic user interface comprises a graphical presentation of the results.

26. Apparatus according to claim 16, and comprising a computer at the teaching facility which stores the results of the experiment.

27. Apparatus according to claim 16, wherein the experimental setup comprises a plurality of substantially independent experiments.

28. Apparatus according to claim 16, wherein a second operator, other than the operator at the teaching facility, controls the aspect of the experimental setup.

29. Apparatus according to claim 16, and comprising apparatus at the teaching facility which is used in conjunction with the experimental setup to make experimental measurements.

30. Apparatus according to claim 16, wherein the laboratory site is remote from the Earth's surface.

31. A method for performing an experiment using an experimental setup at a laboratory site having one or more experimental controls for varying one or more parameters of the experiment, while controlling and monitoring the experiment at a teaching facility remote from the laboratory site, comprising:

providing one or more experimental controls and one or more monitoring devices at the laboratory site;

providing a physical representation of at least a part of the experimental setup, including at least one of the experimental controls, at the teaching facility;

responsive to operation of the physical representation of the experimental controls at the teaching facility, exchanging data between the laboratory site and the teaching facility via a network so as to vary one or more parameters of the experiment;

capturing information relating to the experiment using one or more monitoring devices at the laboratory site; and transferring the captured information over the network for display at the teaching facility.

32. A method according to claim 31, wherein exchanging data between the laboratory site and the teaching site comprises allocating a level of access for the operation of the physical representation.

33. A method according to claim 31, wherein providing the one or more experimental controls comprises operating the one or more experimental controls by a computer at the laboratory site.

34. A method according to claim 31, wherein the operation of the physical representation is performed by at least one operator.

35. A method according to claim 31, wherein capturing information comprises generating one or more images of the experimental setup.

36. A method according to claim 31, wherein providing the one or more monitoring devices comprises providing one or more video cameras which are operated by the one or more experimental controls.

37. A method according to claim 31, wherein providing the one or more experimental controls comprises providing one or more robot positioning devices which adjust the one or more experimental controls.

38. A method according to claim 31, wherein transferring the captured information comprises displaying a graphic user interface comprising controls enabling the operator to control the experimental setup.

39. A method according to claim 33, wherein transferring the captured information comprises storing the results of the experiment in the computer.

40. A method according to claim 31, wherein transferring the captured information comprises storing the results of the experiment in a computer at the teaching facility.

41. A method according to claim 31, and comprising providing apparatus at the teaching facility which is used in conjunction with the experimental setup to make experimental measurements.

* * * * *